(12) United States Patent
Oskotsky et al.

(10) Patent No.: US 10,859,798 B2
(45) Date of Patent: Dec. 8, 2020

(54) WIDE FIELD OF VIEW F-THETA LENS

(71) Applicant: BAE Systems Information and Electronic Systems Integration Inc., Nashua, NH (US)

(72) Inventors: Mark L Oskotsky, Mamaroneck, NY (US); Daniel Engheben, Roslyn Heights, NY (US); Vincent Lipari, Whitestone, NY (US); Michael J Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 336 days.

(21) Appl. No.: 16/123,520

(22) Filed: Sep. 6, 2018

(65) Prior Publication Data

US 2020/0081225 A1    Mar. 12, 2020

(51) Int. Cl.
  *G02B 9/64* (2006.01)
  *G02B 13/00* (2006.01)
  *G02B 13/04* (2006.01)

(52) U.S. Cl.
  CPC ........... *G02B 13/0005* (2013.01); *G02B 9/64* (2013.01); *G02B 13/04* (2013.01)

(58) Field of Classification Search
  CPC ....... G02B 9/64; G02B 13/04; G02B 13/0005
  USPC .......................................................... 359/662
  See application file for complete search history.

(56) References Cited

U.S. PATENT DOCUMENTS

| | | | |
|---|---|---|---|
| 4,436,383 A | 3/1984 | Maeda | |
| 5,404,247 A | 4/1995 | Cobb et al. | |
| 5,835,280 A | 11/1998 | Griffith | |
| 6,084,723 A | 7/2000 | Matsuzawa et al. | |
| 6,388,817 B2 | 5/2002 | Nakai | |

(Continued)

FOREIGN PATENT DOCUMENTS

EP    1081525 A2    3/2001

OTHER PUBLICATIONS

"Herbert Goss, Design and Correction of Optical Systems, Part 12: Correction of Aberrations 1, Summer Term 2012, Institute of Applied Physics, 45 pages, Retreived Nov. 1, 2018, Retrieved from https://www.iap.uni-jena.de/iapmedia/Lecture/Design+and+correction+of+optical+systems1351638000/DaCOS12_Lecture_Part_12_Correction_of_aberrations_1_112.pdf".

(Continued)

*Primary Examiner* — Evelyn A Lester
(74) *Attorney, Agent, or Firm* — Maine Cernota & Rardin

(57) ABSTRACT

An F-theta lens provides more than 88 degrees FFOV, F #2.8 or less, length not more than 200 mm, and/or 2.5 μm or better resolution, with color correction from 450 nm to 650 nm. The lens includes three optical groups having positive, negative, and positive optical powers respectively, which can include four, four, and six elements, respectively. Embodiments include an aperture stop in the center of the second optical group. Refractive indices and ray heights are selected to correct for field curvature. Embodiments further include a CMOS detector having pixel pitch of 1.25 microns or less, density of 18 megapixels or more, focal plane diameter of 57.2 mm or more, Nyquist sampling of 400 lines per mm or more and wide pixel field of view of 30° or more. A plurality of CMOS detectors can be arrayed to create a mosaic image.

29 Claims, 11 Drawing Sheets

(56) References Cited

U.S. PATENT DOCUMENTS

| | | |
|---|---|---|
| 8,462,439 B2 | 6/2013 | Oskotsky et al. |
| 8,879,171 B2* | 11/2014 | Wunderlich ....... G02B 27/0031 |
| | | 359/662 |
| 2013/0050839 A1* | 2/2013 | Oskotsky ............... G02B 13/18 |
| | | 359/662 |

OTHER PUBLICATIONS

F-Theta Lenses Tutorial, Thorlabs, Jul. 19, 2018, 2 pages, Retrieved on Nov. 1, 2018, Retrieved from https://www.thorlabs.com/newgrouppage9.cfm?objectgroup_id=10766.

Herbert Goss, Imaging and Abberration Theory, Lecture 8: Astigmatism and Field Curvature, Dec. 14, 2012, Institute of Applied Physics, 53 pages, Retrieved on Nov. 1, 2018, Retreived from https://www.iap.uni-jena.de/iapmedia/de/Lecture/Imaging+and+aberration+theory1396134000/IAT13_Imaging+and+aberration+Theory+Lecture+8+Astigmatism+and+field+curvature-p-20001065.pdf.

* cited by examiner

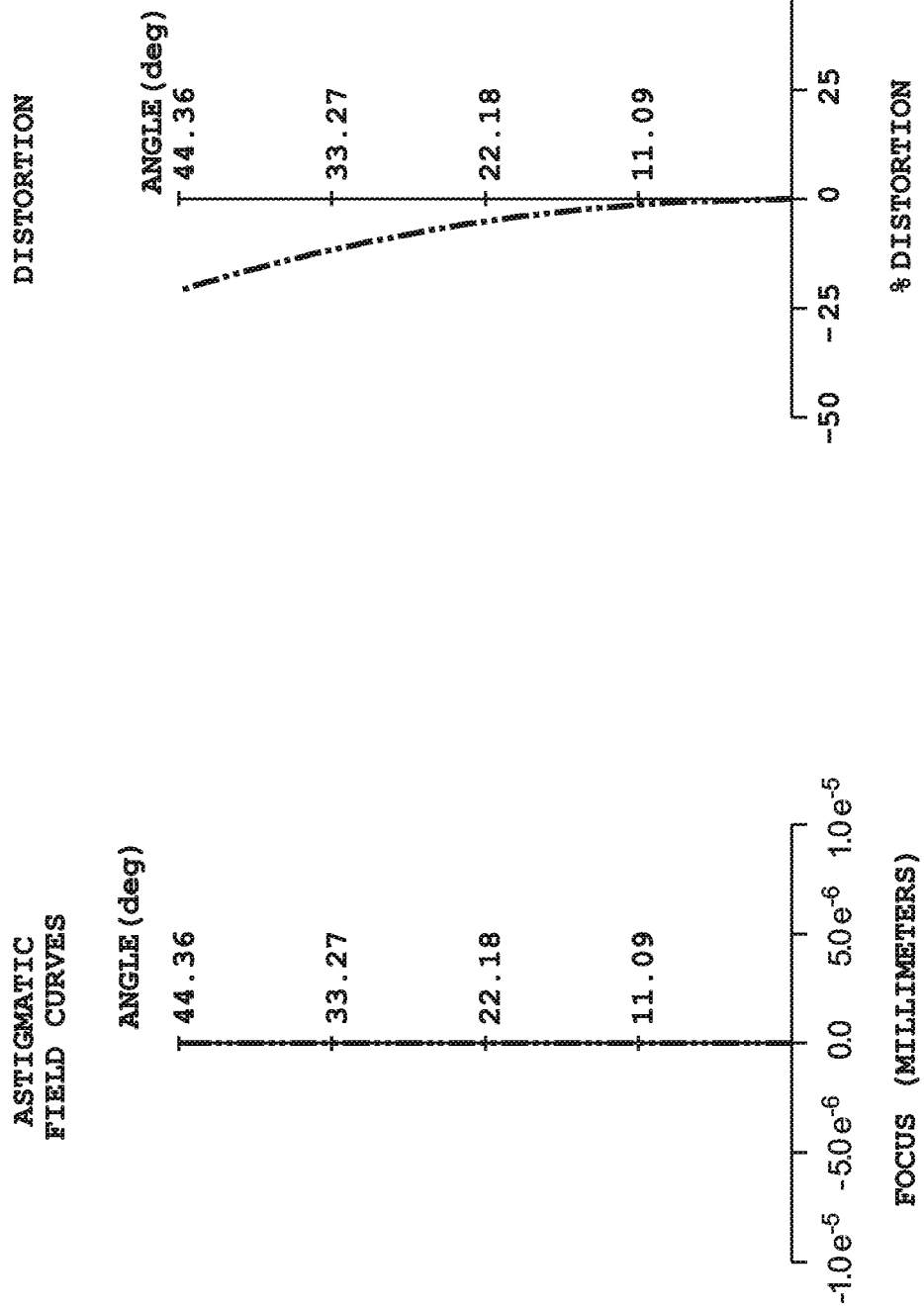

WIDE FIELD OF VIEW F-THETA LENS

FIELD

The disclosure relates to lens design, and more particularly, to the design of F-theta lenses.

BACKGROUND

With reference to FIG. 1, a traditional, spherical lens 100 when corrected for astigmatism can only form an image onto a spherically curved surface 102. If the image is sampled instead in a flat plane, using film or a focal plane array of "charge-coupled devices" (CCD device), the result is both distortion and a loss of focus, especially near the outer regions of the image. So-called "flat field lenses" are typically designed to reduce this "field curvature" effect, and to provide a flat image plane, which means excellent image quality and consistent depth of focus over the field of view. However, the image from a flat field lens remains spatially distorted, because each "ray" of light that enters the lens is directed to a pixel whose offset from the center of the image is proportional to the tangent of the incident angle of the light onto the lens, rather than being proportional directly to the incident angle, which would ideally be the case. Often, it is necessary to perform complex electronic corrections to the image to compensate for this spatial distortion.

F-theta lenses, on the other hand, include intentional, negative "barrel" distortion that compensates for the spatial distortion effect of a flat field lens, and yields an image that is linear with field of view. F-theta lenses are thereby able to eliminate the need for complicated electronic correction by providing focused images on a flat plane without spatial distortion.

Accordingly, while F-theta lenses tend to be more sophisticated, and therefore more costly, larger, and heavier than spherical or flat lenses, they are often an optimal choice for high performance applications such as laser scanning or engraving, image transfer, and material processing, as well as airborne surveillance and reconnaissance applications where identification and precise mapping of targets and features is required. Because F-theta lenses are designed with built-in barrel distortion, light from each incident ray is directed to a location on the image according to the linear product of the focal length F of the lens and the angle of incidence, or "field angle" θ of the ray, thereby simplifying target and feature location algorithms.

Another important aspect of F-theta lenses is the so-called "F-number" or F/#, which is the dimensionless ratio of the focal length to the entrance pupil diameter, and is a measure of the light gathering ability of the lens. Lenses having lower F/#s deliver increased light flux to the image plane, thereby increasing the sensitivity of the imaging system. Lower F/#s also mean higher resolution, which helps in the identification of targets and other features in the imagery.

For many applications, it is desirable for an F-theta lens to provide very large images having very high image resolution. The resolution of a lens is defined as the diameter of the spot size created by the lens when imaging an infinitely small object. Diffraction-limited lenses, in general, will produce a spot of diameter D (Airy Disc Diameter) given by $$D=2.44*\lambda F\# \tag{1}$$

Where D is the Diameter of the spot in microns to the first intensity zero, λ is the wave length of the light (the "working wavelength" in microns) and F/# is the (dimensionless) F-number of the optical system.

Equation 1 can be simplified by applying some approximations for visual imaging systems, including F-theta lenses. For example, if it is assumed that the working wavelength is 0.546 microns, Equation 1 can be simplified to:

$$D\mu=1.33*F\# \tag{2}$$

Note that the resolution at the image plane is inverse to the F # of the lens.

The image size IM of the F-theta lens is given by formula:

$$IM=2\theta*f'' \tag{3}$$

where θ is half of the field of view and f' is the focal length of the lens.

In order to maintain an image size that is proportional to the field of view, the F-theta lens must have a large negative barrel distortion, which complicates the design of such lenses. The image plane must also be flat for a good depth of field, which means that the field curvature and astigmatism must also be corrected.

Field curvature and astigmatism correction depend on the optical powers and shapes of the optical elements included in the lens. In order to create a flat field, a special arrangement must be made of the powers and placements of the optical elements.

FIG. 2 illustrates the effect of the shape of a single optical element on the field curvature and astigmatism of the lens. According to the illustration, it can be seen that there is a shape that does not include astigmatism (near −0.005 or −0.0325 on the horizontal axis). However, all of the illustrated shapes cause field curvature. When the optical system is corrected for astigmatism, tangential and sagittal images coincide on the image curved surface 102, also called the Petzval surface, as illustrated in FIG. 2.

The Petzval curvature for an optical system having k optical element surfaces is given by:

$$\frac{1}{R_{ptz}} = -n'_m \sum_k \frac{n'_k - n_k}{n_k \cdot n'_k \cdot r_k} \tag{4}$$

where $R_{ptz}$ is the radius of the image surface (102 of FIG. 1), k is the number of optical element surfaces, $n_m'$ is the refractive index of the final media, $n_k$ is the refractive index before the optical element surface, $n_k'$ is the refractive index after the optical element surface, and $r_k$ is the radius of the optical element surface.

The Petzval field curvature for a lens having j thin optical elements positioned in air is expressed by:

$$\frac{1}{R_{ptz}} = -\sum_j \frac{1}{n_j \cdot f_j} \tag{5}$$

where $R_{ptz}$ is the radius of the image surface (102 of FIG. 1), $n_j$ is the refractive index of the j'th optical element, and $f_j$ is the focal length of the j'th optical element. A visual representation of such an optical system is presented in FIG. 3.

The field curvatures as indicated in the figure are given by:

$$\Delta S'_{tan} - \Delta S'_{pet} = 3(\Delta S'_{sag} - \Delta S'_{pet}) \quad (6)$$

$$\Delta S'_{pet} = \frac{3\Delta S'_{sag} - \Delta S'_{tan}}{2} \quad (7)$$

The astigmatism is then given by the difference:

$$\Delta S_{ast}' = \Delta S_{tan}' - \Delta S_{sag}' \quad (8)$$

and the best image shell is given by $$\Delta S'_{best} = \frac{\Delta S'_{sag} - \Delta S'_{tan}}{2} \quad (9)$$

For an optical system having a positive focal length, the Petzval curvature is negative.

To correct for field curvature the following additional conditions must be met:
1. Positive lenses shall have high refractive index and large marginal ray heights. These give large contributions to the total optical power and low weighting in the Petzval sum.
2. Negative lenses shall have low refractive index, and small marginal ray heights. These give small negative contributions to the total optical power and high weighting in the Petzval sum.

When maximizing field of view, the problem of correcting Petzval curvature becomes even more difficult. Furthermore, it is desirable to minimize the focal length, so as to reduce the necessary size of the lens and provide a more compact and cost effective optical system.

In order to provide good imaging across the wavelength spectrum 450 nm-650 nm, both the axial chromatic aberration and the lateral color have to be corrected. Axial chromatic aberration, often referred to as axial color, is the chromatic variation of the image as a function of position, also sometimes referred to as the chromatic focal shift. If the axial chromatic aberration is not compensated, the focal length of the system will change undesirably with the light spectrum received from the object, causing chromatic aberration, or color fringes, to appear at the edges of the projected image of the object. Lateral chromatic aberration, or a chromatic difference in the magnification, which is often referred to as lateral color, is the chromatic variation of the image as a function of size.

Chromatic dispersion in a given glass material occurs because the material's index of refraction (n) varies according to the wavelength of light transmitted through the material. The degree of this variation is represented by the so-called Abbe value ($V_d$) for a given type of glass.

Specifically, $$V_d = (n_d - 1)/(n_f - n_c) \quad (10)$$

where $n_d$ is the index of refraction of the glass at the wavelength of the helium d line (587.6 nm), $n_f$ is the index at the hydrogen f line (486.1 nm), and $n_c$ is the index at the hydrogen c line (656.3 nm).

For a single optical element with optical power $\Phi$, the change $\Delta\Phi$ in optical power introduced by axial chromatic aberration is:

$$\Delta\Phi = \Phi/V \quad (11)$$

and the achromatic condition for the doublet is:

$$\Phi_1/V_1 - \Phi_2/V_2 = 0 \quad (12)$$

where $\Phi_1$ and $V_1$ are the optical power and Abbe number for the first optical element and $\Phi_2$ and $V_2$ are the optical power and Abbe number for the second optical element. A Schott glass Abbe diagram is presented in FIG. 4.

The height of the chief ray at the image plane defines image size. When lateral color is present in the lens system, the refraction of the chief ray will vary as a function of wavelength, causing each wavelength to be imaged at a slightly different height on the image plane. The result will be a chromatic radial blur for the off-axis image points. The simple formula to represent the lateral color is:

$$2\Delta y' = (\frac{1}{2}V_m)D \quad (13)$$

where $\Delta y'$ is change in the image height between the short and long wavelengths; $V_m$ is Abbe number for the middle wavelength and D is the entrance pupil diameter.

The entire image area will show lateral color at the image of the edge of the field stop. In overcorrected systems the edge of the field will be tinged with blue, while in undercorrected systems it will be tinged with red.

The other aberration impacting optical system performance is residual spherochromatism. Spherochromatism is a longitudinal aberration and represents the difference of the spherical aberrations for different wavelengths across the spectrum.

The nature of spherochromatic aberration is illustrated in FIG. 5, where Rp is the radius of the pupil, and Z is the optical axis.

According to the graph of FIG. 5, the optical system is achromatic, in that rays for short and long wavelength intersect on the optical axis. However, because of spherical aberration, which changes with wavelength and pupil size, there still is residual chromatic aberration across the pupil.

Finally, an F-theta lens used in airborne sensors for photography and mapping should provide high resolution for object shape identification.

In certain applications therefore, such as airborne surveillance, it would be desirable to provide an F-theta lens that possesses a very wide angle "full field of view" (FFOV), for example of more than 88 degrees, in combination with a low F/#, for example not more than 2.8. It would be further desirable to provide an optical imaging system that combines an F-theta lens having a very wide FFOV with suitable optical remote sensors so as to be able to identify and precisely map objects for reconnaissance and surveillance applications.

SUMMARY

In a first general aspect of the present disclosure an F-theta lens is disclosed that possesses a "full field of view" (FFOV) of more than 88 degrees, in combination with an F-number (F/#) of not more than 2.8. In embodiments, the lens has a length of not more than 200 mm. Embodiments provide resolution of 2.5 µm or better. Embodiments are color corrected over a wavelength range of 450 nm to 650 nm.

The disclosed F-theta lens includes three groups of optical elements. In order from the object to the image plane, the first and third groups of optical elements have positive optical powers, while the second group of optical elements has a negative optical power.

To correct for field curvature, the following conditions are met:

The positive optical elements have high refractive indices and large marginal ray heights that make large positive contributions to the power of the lens with low weighting in the Petzval sum.

The negative optical elements have low refractive indices, and small marginal ray heights that make small negative contributions to the power of the lens with high weighting in the Petzval sum.

To correct axial color, the optical elements are configured and positioned relative to one another so that the focal length of the lens system is the same at 450 nm and at 650 nm, as well as at an intermediate wavelength.

So as to simultaneously correct for axial color, lateral color and spherochromatic aberration, the lens optical element glasses are arranged in an order that provides appropriate correlations between the refractive indices and dispersions of the glasses used in the optical elements.

In various embodiments, the first group of optical elements comprises four optical elements having respectively, in order from the object to the image plane, a negative optical power, a negative optical power, a positive optical power and a positive optical power. The second optical group comprises four optical elements, having respectively, in order from the object to the image plane, a positive optical power, a negative optical power, a negative optical power and a positive optical power. The third optical group comprises six optical elements, having respectively, in order from the object to the image plane, a positive optical power, a negative optical power, a positive optical power, a negative optical power, a positive optical power, and a negative optical power.

In embodiments, the lens further includes an aperture stop, and in some of these embodiments the aperture stop is located between the second and third optical elements of the second optical group.

In a second general aspect of the present disclosure, an optical imaging system combines an F-theta lens having a wide FFOV, as described above, with a detector having a small pixel pitch, such as CMOS detectors having a pixel pitch of 1.25 µm. Embodiments of the disclosed optical imaging system support airborne remote sensing requirements associated with the detection and tracking of moving objects.

In certain airborne surveillance embodiments having F # not greater than 2.8, the lens has a focal plane diameter of 57.2 mm and is compatible for use with staring CMOS detectors, which enables Nyquist sampling (400 lines per mm) of targets at requisite frame rates, thereby enabling high quality tracking of targets of interest.

The use of small pixel pitch CMOS detectors in embodiments minimizes the Size, Weight, and Power (SWaP) of the overall optical imaging system, while reducing the cost of the wide field of view (wideFOV) imaging system. In embodiments, a plurality of CMOS detectors (for example 18 megapixel detectors) are arranged in an array format so as to create a mosaic image, and multiple mosaic cameras are used to create seamless large format images. In embodiments, there is a minimum overlap region between adjacent CMOS detectors of 50 image pixels, such that there are no gaps in the mosaic image. This feature allows automated tracking software to track objects between focal planes using the overlap region to transition tracks from one focal plane to another. The CMOS detectors in embodiments also support a wide pixel FOV (30°).

A first general aspect of the present disclosure is a wide field of view F-Theta lens configured to form an image of an object on an image plane. The lens includes a first optical group including a plurality of optical elements, the first optical group having a positive optical power, a second optical group, including a plurality of optical elements, the second optical group having a negative optical power, an aperture stop located within the second optical group, and a third optical group, including a plurality of optical elements, the third optical group having a positive optical power. The lens has a full field of view of at least 88.7 degrees. The lens is color corrected over a wavelength range of 450 nm to 640 nm, wherein the focal length of the lens at 640 nm is equal to the focal length of the lens at 450 nm. The lens has an F-number value of less than 2.8. The lens is achromatic over a range of at least 450 nm to 650 nm. The lens has a length of not more than 200 mm. And the lens has a focal plane diameter of at least 57.2 mm.

In embodiments, each of the optical groups includes at least four optical elements.

In any of the above embodiments, the lens can provide a resolution of 2.5 microns or better.

In any of the above embodiments, the first optical group can include exactly four optical elements. In some of these embodiments, the optical elements in the first optical group are configured such that, in order from the object to the image plane, the optical elements in the first optical group have a negative optical power, a negative optical power, a positive optical power, and a positive optical power, respectively. In any of these embodiments, in order from the object to the image plane, the optical elements of the first optical group can respectively be in the form of:

a first optical element having a double concave shape;
a second optical element having a negative meniscus whose concave surface faces toward the object;
a third optical element having a double convex shape; and
a fourth optical element having a double convex shape.

In some of these embodiments, a first surface of the first optical element of the first optical group is formed aspherical. And in any of these embodiments, a first surface of the second optical element of the first optical group can be formed aspherical.

In any of the above embodiments, the second optical group can include exactly four optical elements. In some of these embodiments, the optical elements in the second optical group are configured such that, in order from the object to the image plane, the optical elements in the second optical group have a positive optical power, a negative optical power, a negative optical power, and a positive optical power, respectively. In any of these embodiments, in order from the object to the image plane, the optical elements of the second optical group can be respectively in the form of:

a first element having a positive meniscus shape whose concave surface faces toward the object;
a second element having a double concave shape;
a third element having a double concave shape; and
a fourth element having a double convex shape.

In some of these embodiments, a second surface of the third optical element of the second optical group is cemented to a first surface of the fourth optical element of the second optical group. In any of these embodiments, a second surface of the first element of the second optical group is formed aspherical. And in any of these embodiments, a second surface of the second element of the second optical group is formed aspherical.

In any of the above embodiments in which the second optical group includes exactly four optical elements, the aperture stop can be located within the second optical group such that two of the optical elements of the second optical group are between the object and the aperture stop, and two of the optical elements of the second optical group are between the aperture stop and the image plane.

In any of the above embodiments, the third optical group can include exactly six optical elements. In some of these embodiments, the optical elements in the third optical group are configured such that, in order from the object to the image plane, the optical elements in the third optical group have a positive optical power, a negative optical power, a positive optical power, a negative optical power, a positive optical power, and a negative optical power, respectively. In any of these embodiments, in order from the object to the image plane, the optical elements of the third optical group can be respectively in the form of:
- a first optical element having a double convex shape;
- a second optical element having a double concave shape;
- a third optical element having a double convex shape;
- a fourth optical element having a double concave shape;
- a fifth optical element having of a double convex shape; and
- a sixth element having a negative meniscus shape whose concave surface faces toward the object.

In some of these embodiments, a first surface of the second element of the third optical group is formed aspherical. In any of these embodiments, a first surface of the fifth element of the third optical group can be formed aspherical.

In any of the above embodiments, the first optical group can include exactly four optical elements, the second optical group can include exactly four optical elements and the third optical group can include exactly six optical elements, wherein the lens, the first, second, and third optical groups, and the optical elements of the first, second and third optical groups satisfy the following relationships:

$0.35 < F1/F10 < 0.45;$ $-0.40 < F10/F20 < -0.30;$ $1.18 < F10/F30 < 1.34;$ $-1.85 < F10/F101 < -1.65;$ $0.085 < F101/F102 < 0.15;$ $-0.34 < F101/F103 < -0.25;$ $-0.56 < F101/F104 < -0.48;$ $1.75 < F30/F301 < 1.95;$ $-1.10 < F301/F302 < -0.90;$ $0.70 < F301/F303 < 0.85;$ $-0.75 < F301/F304 = F301/F306 < -0.68;$ $0.80 < F301/F305 < 0.86;$ $-1.40 < F20/F201 < -1.20;$ $-1.55 < F201/F202 < -1.35;$ $-4.45 < F201/F203 < -4.30;$ $3.80 < F201/F204 < 4.25;$ $0.90 < n101/n102 = n101/n104 < 0.96;$ $0.84 < n101/n103 < 0.88;$ $0.85 < n201/n202 = n201/n203 = n201/n204 < 1;$ $0.85 < n301/n302 = n301/n304 < 0.95;$ $0.90 < n301/n303 < 1.15;$ $0.75 < n301/n305 = n301/n306 < 0.88;$ $1.14 < V101/V102 = V101/V104 < 1.22;$ $2.45 < V101/V103 < 2.65;$ $1.65 < V201/V202 = V201/V203 < 1.85;$ $1.15 < V201/V204 < 1.35;$ $2 < V301/V302 = V301/V304 = V301/V306 < 2.25;$ $0.90 < V301/V303 < 1.15;$ and $3.30 < V301/V305 < 3.55;$ where:
F1 is the focal length of the lens;
F10, F20 and F30 are the focal lengths of the first, the second and the third optical groups respectively;
F101, F102, F103 and F104 are the focal lengths of the optical elements of the first optical group respectively in order from the object to the image plane;
F201, F202, F203 and F204 are the focal lengths of the optical elements of the second optical group respectively in order from the object to the image plane;
F301, F302, F303, F304, F305 and F306 are the focal lengths of the optical elements of the third optical group respectively in order from the object to the image plane;
n101, n102, n103 and n104 are the indices of refraction of the optical elements of the first optical group respectively in order from the object to the image plane; and
n201, n202, n203 and n204 are the indices of refraction of the optical elements of the second optical group respectively in order from the object to the image plane;
n301, n302, n303, n304, n305 and n306 are the indices of refraction of the optical elements of the second optical group respectively in order from the object to the image plane;
V101, V102, V103, and V104 are the Abby numbers of the optical elements of the first optical group respectively in order from the object to the image plane.
V201, V202, V203, and V204 are the Abby numbers of the optical elements of the second optical group respectively in order from the object to the image plane; and
V301, V302, V303, V304, V305, and V306 are the Abby numbers of the optical elements of the third optical group respectively in order from the object to the image plane.

A second general aspect of the present disclosure is an optical imaging system that includes a wide field of view, color corrected F-Theta lens configured to form an image of an object on an image plane, the lens a first optical group including a plurality of optical elements, the first optical group having a positive optical power, a second optical group, including a plurality of optical elements, the second optical group having a negative optical power, and a third optical group, including a plurality of optical elements, the third optical group having a positive optical power. The lens has a full field of view of at least 88 degrees and an F-stop value of no more than 2.8. The imaging system further includes a detector configured to detect an image formed on the image plane by the lens.

In embodiments, the detector is a CMOS detector.

In any of the above embodiments, the detector can have a pixel pitch of no more than 1.25 microns.

In any of the above embodiments, the detector can have a Nyquist sampling of at least 400 lines per mm.

In any of the above embodiments, the detector can have a capacity of at least 18 megapixels.

In any of the above embodiments, the detector can have a pixel field of view of at least 30 degrees.

In any of the above embodiments, the detector can include a plurality of focal plane arrays arranged in an array and configured to obtain a mosaic image.

And in some of these embodiments the detector includes a minimum overlap region between adjacent CMOS detectors of 50 image pixels, such that there are no gaps in the mosaic image.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 9A and 9B present distortion graphs for the embodiment of FIG. 6; and

DETAILED DESCRIPTION

A first general aspect of the present disclosure is an F-theta lens that possesses a "full field of view" (FFOV) of more than 88 degrees, in combination with an F-number (F/#) of not more than 2.8. In embodiments, the lens has a length of not more than 200 mm. Embodiments provide resolution of 2.5 μm or better. Embodiments are color corrected over a wavelength range of 450 nm to 650 nm.

Figure 1:
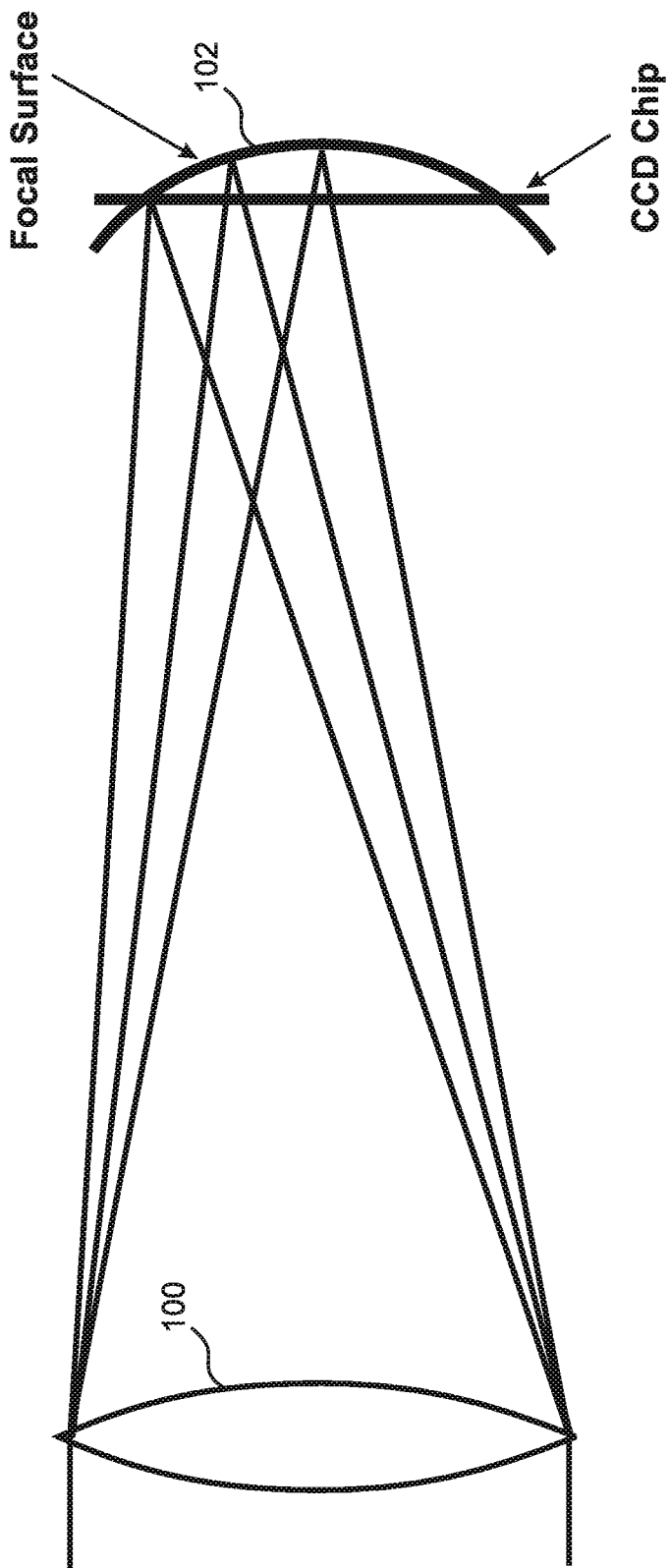
FIG. 1 is a side view of a traditional, spherical lens.
Figure 2:
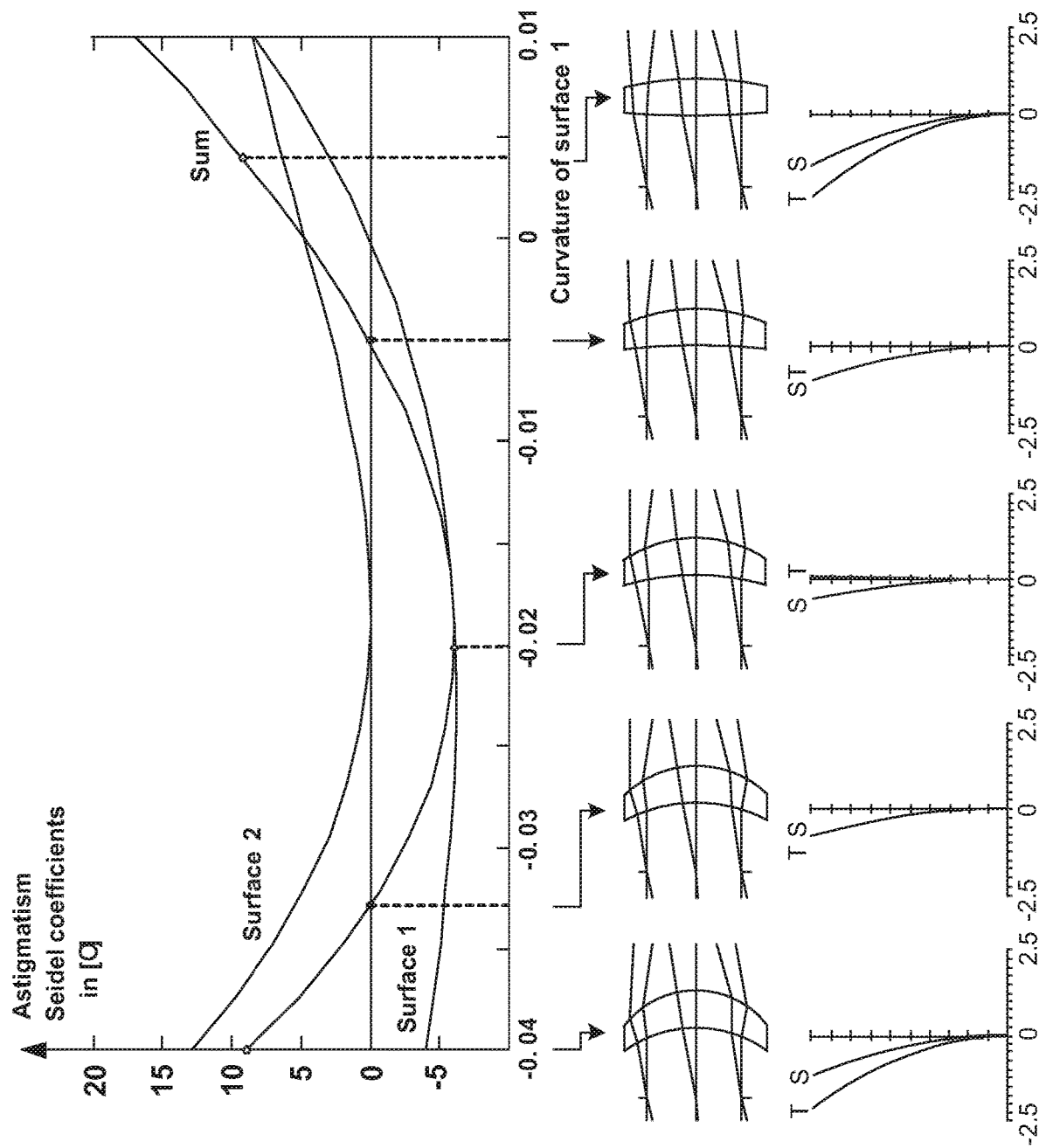
FIG. 2 illustrates the effect of the shape of a single optical element on the field curvature and astigmatism of the lens.
Figure 3:
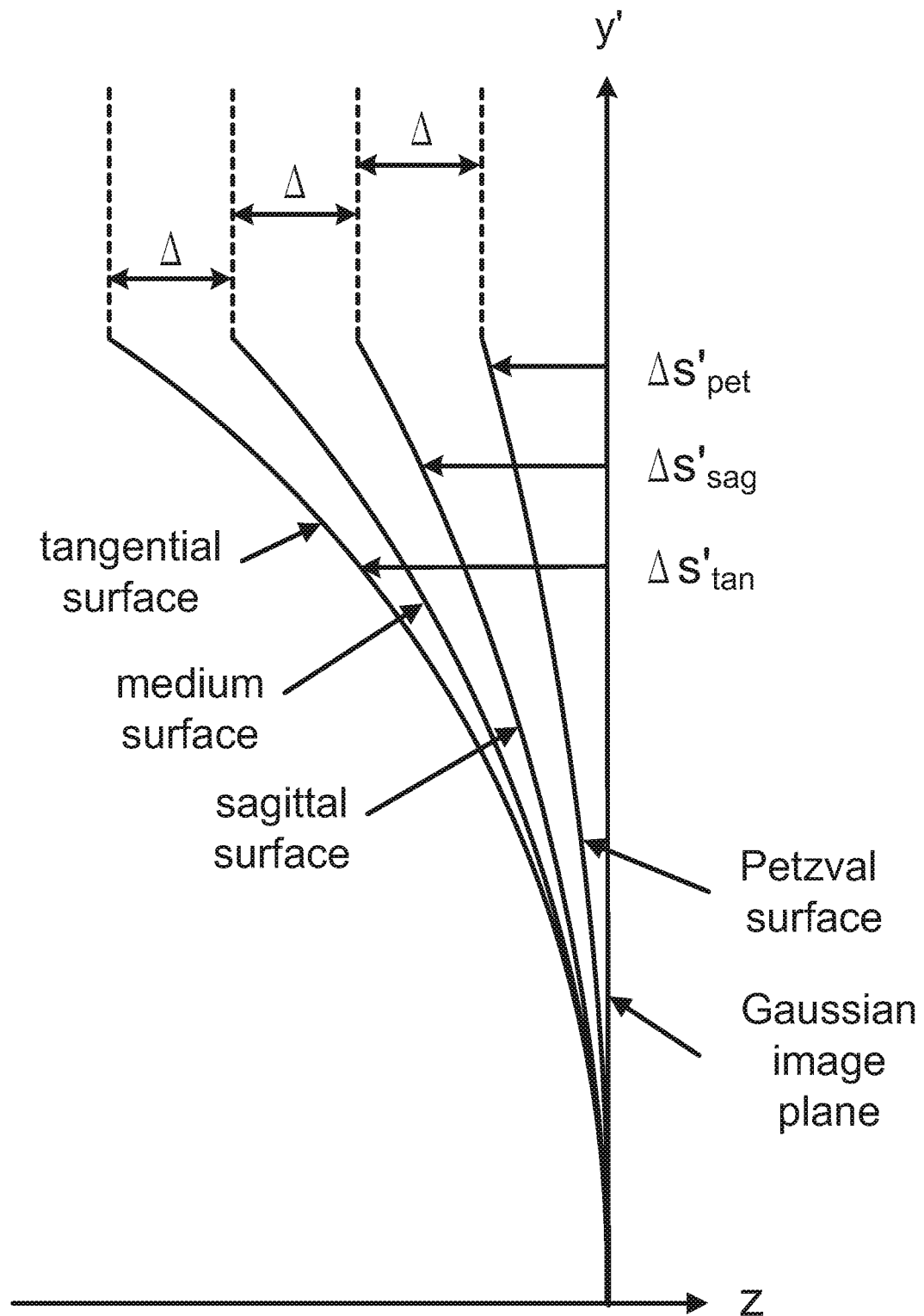
FIG. 3 presents graphs of Petzval field curvature for a lens having j thin optical elements positioned in air.
Figure 4:
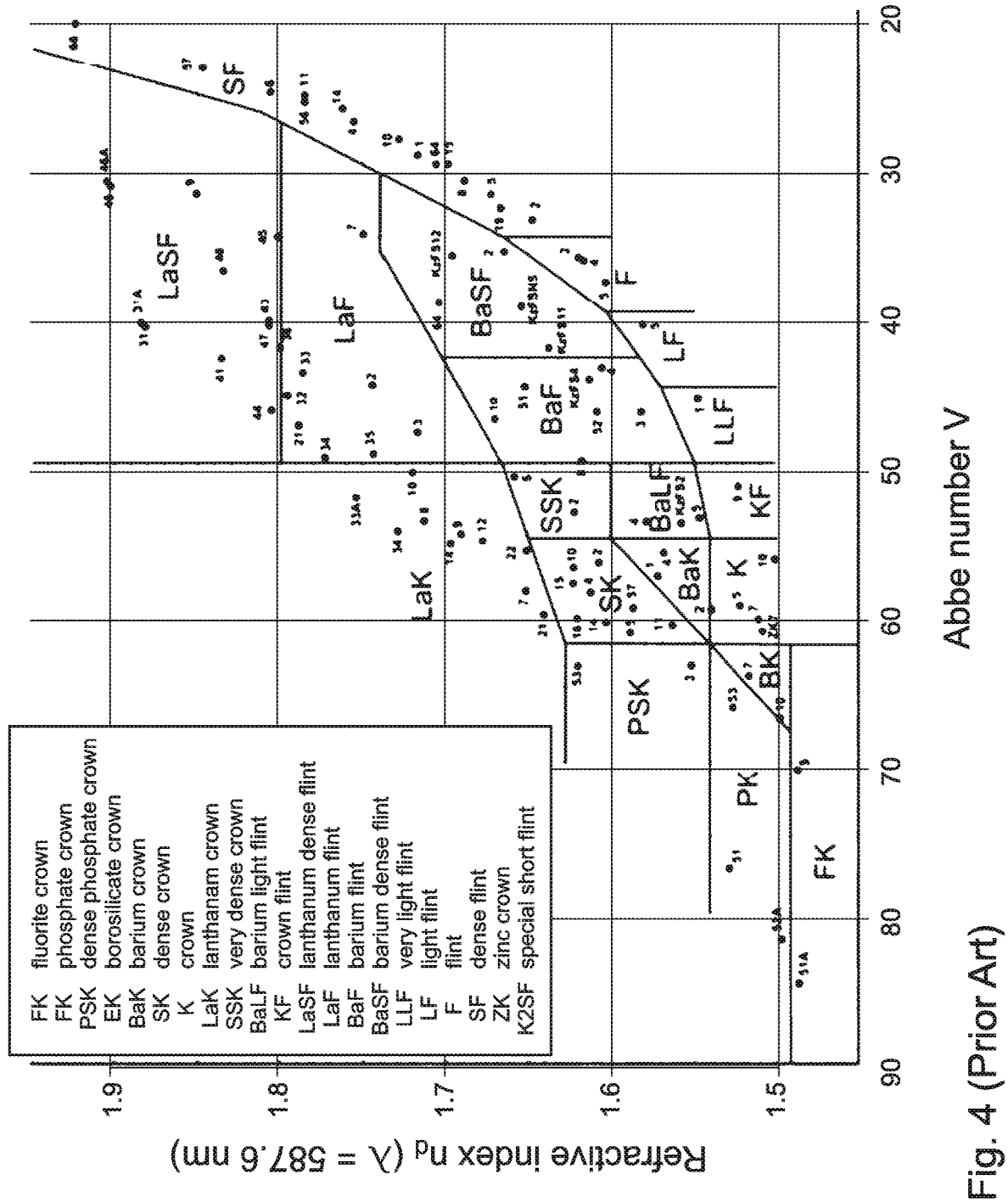
FIG. 4 presents a Schott glass Abbe diagram for a single optical element with optical power $\Phi$.
Figure 5:
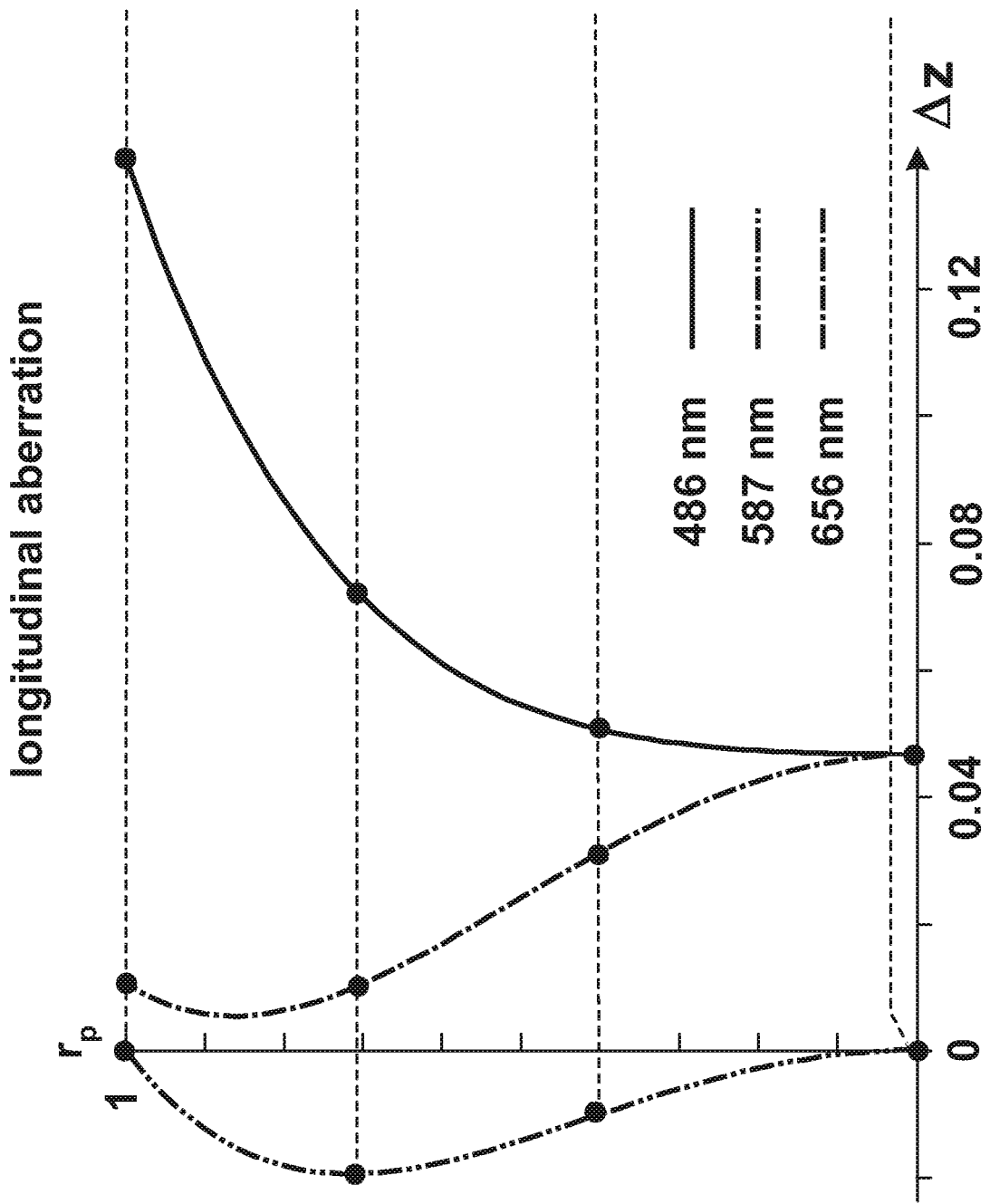
FIG. 5 illustrates the nature of spherochromatic aberration, where Rp is the radius of the pupil, and Z is the optical axis.
Figure 6:
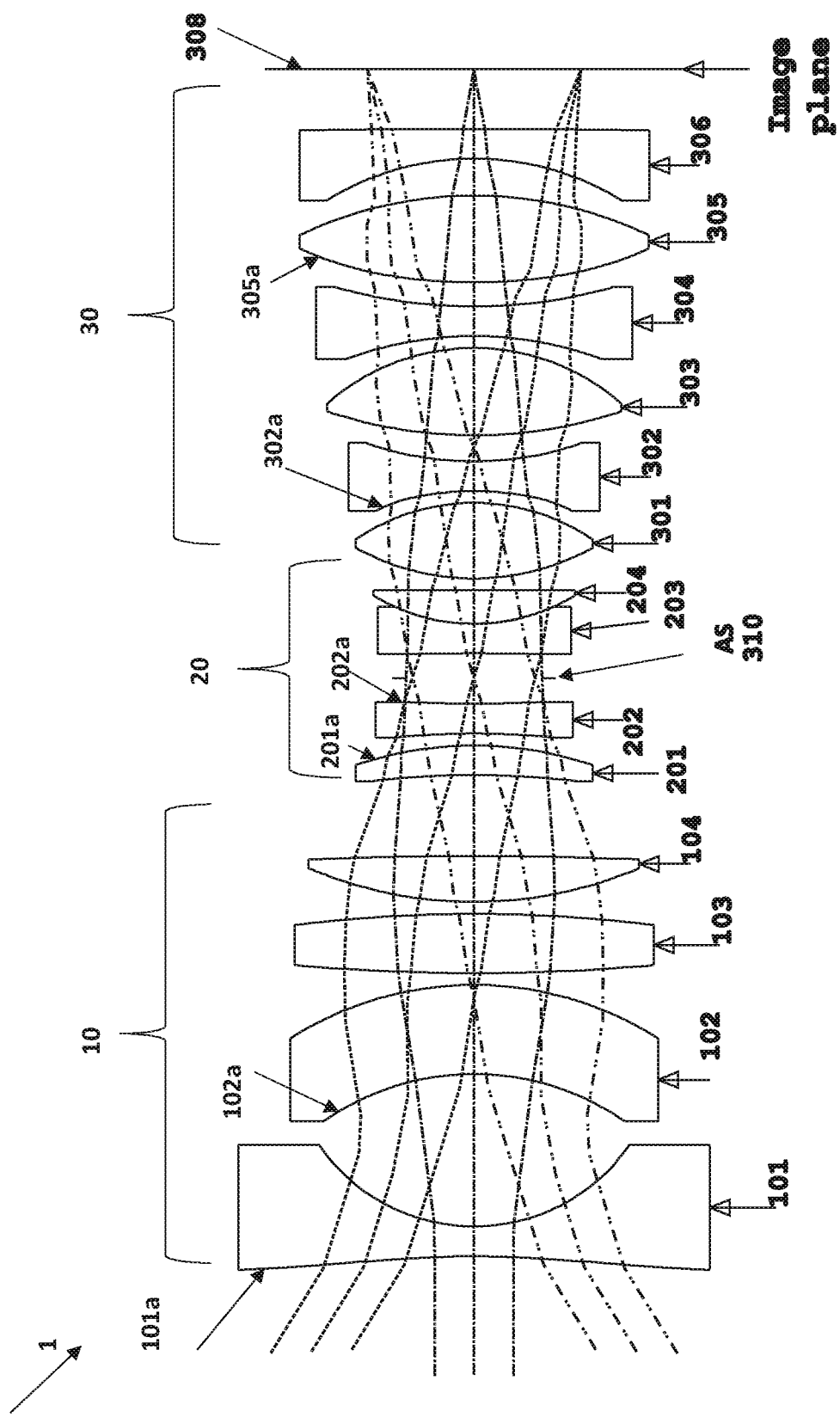
FIG. 6 is a cross-sectional illustration of an embodiment of the lens according to the present disclosure.

With reference to FIG. 6, the disclosed F-theta lens 1 includes three groups of optical elements 10, 20, 30. In order from the object to the image plane, the first 10 and third 30 groups of optical elements have positive optical powers, while the second group 20 of optical elements has a negative optical power.

To correct for field curvature, the following conditions are met:

The positive optical elements have high refractive indices and large marginal ray heights that make large positive contributions to the power of the lens with low weighting in the Petzval sum; and The negative optical elements have low refractive indices, and small marginal ray heights that make small negative contributions to the power of the lens with high weighting in the Petzval sum.

To correct axial color, the optical elements are configured and positioned relative to one another so that the focal length of the lens system is the same at 450 nm and at 650 nm, as well as at an intermediate wavelength between 450 nm and 650 nm.

So as to simultaneously correct for axial color, lateral color and spherochromatic aberration, the optical element glasses are arranged in an order that provides appropriate correlations between the refraction indices and dispersions of the glasses used in the optical elements.

FIG. 6 illustrates a specific embodiment 1 of the disclosed F-theta high resolution lens that is suitable for aerial reconnaissance. The lens 1 includes a first optical group 10, a second optical group 20 and a third optical group 30, where the scene (not shown) is on the left side of the figure and the image plane 308 is on the right side. The aperture stop ("AS") 310 in the illustrated embodiment is located between the second 202 and third 203 optical elements of the second optical group 20. Images of distant objects are formed on the image plane 308.

The first optical group 10 has an overall positive optical power and is configured to receive light from the scene (not shown) and to direct the converged light onto the second optical group 20. The first optical group 10 includes four optical elements 101, 102, 103 and 104 having negative, negative, positive and positive optical powers respectively. As seen in FIG. 6 the first optical element 101 of the first optical group 10 has a negative optical power and is formed as a double concave lens. The second optical element 102 has a negative optical power and is formed as a negative meniscus whose concave surface 102a faces toward the object. The third optical element 103 has a positive optical power and is formed as a double convex lens. The fourth optical element 104 has a positive optical power and is formed as a double convex lens.

In the illustrated embodiment, the first surface 101a of the first optical element 101 is formed as an aspherical surface in order to reduce the F # of the lens 1 and to correct spherical aberration. The first surface 102a of the second optical element 102 is formed as an aspherical surface for correction of sagittal astigmatism.

The mutual configuration of the four optical elements 101, 102, 103, 104 of the first optical group 10 results in correction of spherical aberration while providing a low F #, coma and astigmatism, without introducing any F-theta nonlinearity distortion across the field. Also, the mutual combination of optical powers, refractive indices, and dispersions allows correction of the chromatic aberrations while satisfying relationships required among the optical elements to achieve high resolution of the lens 1.

The second optical group 20 of optical elements has a negative overall optical power, and is configured to diverge light from the first optical group 10 and to direct the diverged light onto the third optical group 30. The second optical group 20 includes four optical elements 201, 202, 203 and 204, having a positive optical power, a negative optical power, a negative optical power and a positive optical power respectively. The first optical element 201 of the second optical group 20 is in the form of a positive meniscus whose concave surface faces toward the object, the second optical element 202 is in a form of a double concave lens, the third optical element 203 is in a form of a double concave lens, and the fourth optical element 204 is in a form of a double convex lens.

In the illustrated embodiment, the third optical element 203 and the fourth optical element 204 are cemented together to provide achromatic correction. Also, in the illustrated embodiment, the second surface 201a of the first optical element 201 and the second surface 202a of the second optical element 202 are formed as aspherical surfaces in order to correct for the pupil coma and pupil spherical aberration respectively. The aperture stop AS (310) is located between the second optical element 202 and third optical element 203 so as to minimize the diameters of the optical groups 10, 20 and 30 and to shorten the overall length of the lens 1.

The mutual configuration and choice of glasses of the optical elements 201, 202, 203, 204 in the second optical group 20 correct residual chromatic aberration, spherochromatism and pupil coma across the field of the lens 1 through the desired spectrum of 450 nm to 650 nm.

The third optical group 30 has a positive overall power and is configured to converge the light from the second optical group 20 and to focus the light onto the image plane 308. The third optical group 30 includes six optical elements 301, 302, 303, 304, 305 and 306, having positive, negative, positive, negative, positive and negative optical powers respectively. The first optical element 301 of the third optical group 30 is formed as a double convex lens. The second optical element 302 is formed as a double concave lens. In the illustrated embodiment, the first surface 302a of the second optical element 302 is formed as an aspherical surface to correct for tangential astigmatism and high order coma across the field. The third optical element 303 is formed as a double convex lens. The fourth optical element 304 is formed as a double concave lens. The fifth optical element 305 is formed as a double convex lens. In the illustrated embodiment, the first surface 305a of the fifth optical element 305 is formed as an aspherical surface for correction of residual astigmatism and high order distortion across the field. The sixth element 306 is formed as a negative meniscus whose concave surface faces toward the object.

The mutual configuration of the third optical group 30 of optical elements 301-306, including their optical powers, shapes, and glass dispersions provides correction of high order astigmatism and distortion linearity without introducing spherochromatism or lateral color.

Mutual combination of optical powers of the groups 10, 20 and 30 allows correction of the Petzval curvature, along with providing the F-theta distortion feature across a field of view of 88.7°. Altogether, in this embodiment the combination of optical powers, glass refractive indices, and dispersions of the optical elements inside the optical groups 10, 20 and 30 provides correction of the axial color, lateral color and spherochromatism, while achieving a low F # of 2.8. The overall length of the lens 1 of the illustrated embodiment is 200 mm.

The following relations among the optical groups 10, 20, 30 and their constituent optical elements have been configured to achieve aberrational correction across an 88.7° field along with F-theta distortion, monochromatic and chromatic aberration correction for F/2.8, while making the lens 1 compact, with overall length no greater than 200 mm:

$0.35 < F1/F10 < 0.45$ $-0.40 < F10/F20 < -0.30$ $1.18 < F10/F30 < 1.34$ $-1.85 < F10/F101 < -1.65$ $0.085 < F101/F102 < 0.15$ $-0.34 < F101/F103 < -0.25$ $-0.56 < F101/F104 < -0.48$ $0.90 < n101/n102 = n101/n104 < 0.96$ $0.84 < n101/n103 < 0.88$ $1.14 < V101/V102 = V101/V104 < 1.22$ $2.45 < V101/V103 < 2.65$ $-1.40 < F20/F201 < -1.20$ $-1.55 < F201/F202 < -1.35$ $-4.45 < F201/F203 < -4.30$ $3.80 < F201/F204 < 4.25$ $0.85 < n201/n202 = n201/n203 = n201/n204 < 1$ $1.65 < V201/V202 = V201/V203 < 1.85$ $1.15 < V201/V204 < 1.35$ $1.75 < F30/F301 < 1.95$ $-1.10 < F301/F302 < -0.90$ $0.70 < F301/F303 < 0.85$ $-0.75 < F301/F304 = F301/F306 < -0.68$ $0.80 < F301/F305 < 0.86$ $0.85 < n301/n302 = n301/n304 < 0.95$ $0.90 < n301/n303 < 1.15$ $0.75 < n301/n305 = n301/n306 < 0.88$ $2 < V301/V302 = V301/V304 = V301/V306 < 2.25$ $0.90 < V301/V303 < 1.15$ $3.30 < V301/V305 < 3.55$

Wherein:
F1 is the focal length of the lens 1.
F10, F20 and F30 are the focal lengths of the first optical group 10, second optical group 20 and third optical group 30 respectively.
F101, F102, F103 and F104 are the focal lengths of the optical elements 101, 102, 103 and 104 of the first optical group 10.
F201, F202, F203 and F204 are the focal lengths of the optical elements 201, 202, 203 and 204 of the second optical group 20.
F301, F302, F303, F304, F305 and F306 are the focal lengths of the optical elements 301, 302, 303, 304, 305 and 306 of the third optical group 30
n101, n102, n103 and n104 are the indices of refraction of the optical elements 101, 102, 103 and 104 of the first optical group 10.

n201, n202, n203 and n204 are the indices of refraction of the optical elements 201, 202, 203 and 204 of the second optical group 20.

n301, n302, n303, n304, n305 and n306 are the indices of refraction of the optical elements 301, 302, 303, 304, 305 and 306 of the third optical group 30.

V101, V102, V103 and V104 are the Abbe numbers of the optical elements 101, 102, 103 and 104 of the first optical group 10.

V201, V202, V203 and V204 are the Abbe numbers of the optical elements 201, 202, 203 and 204 of the first optical group 20.

V301, V302, V303, V304, V305 and V306 are the Abbe numbers of the optical elements 301, 302, 303, 304, 305 and 306 of the third optical group 30.

Figure 7:
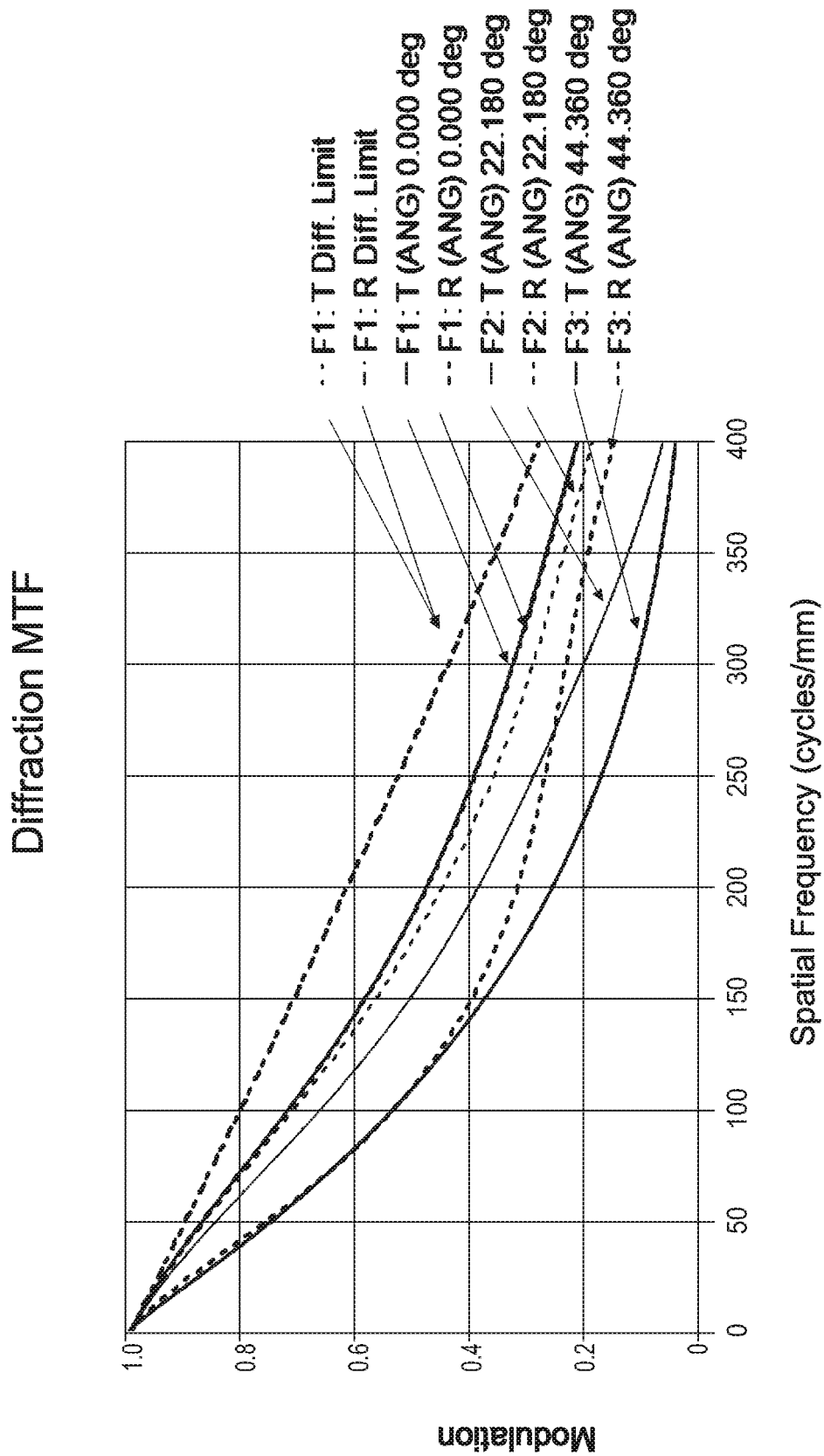
FIG. 7 presents MTF data for the embodiment of FIG. 6.

Polychromatic MTF data for the embodiment of FIG. 6 for the wavelength range of 450 nm to 650 nm is presented in FIG. 7. It can be seen that the lens 1 has 2.5 microns resolution across the field of 88.7°.

Figure 8:
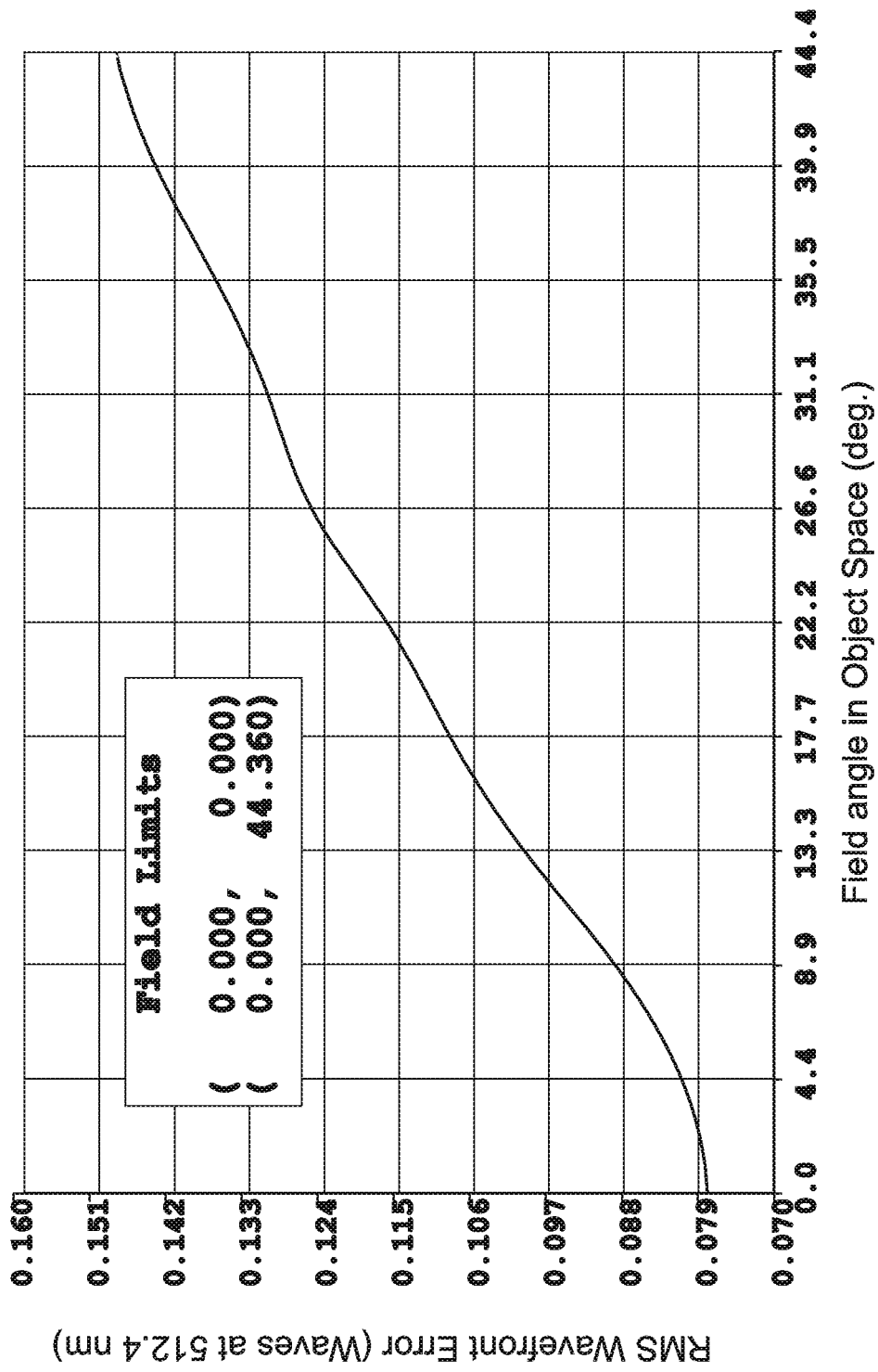
FIG. 8 presents wave front data for the embodiment of FIG. 6.

Wave front data for the embodiment of FIG. 6 is presented in FIG. 8. It can be seen that the axial point wave front is diffraction limited and it is smooth across the entire field.

FIGS. 9A and 9B show the field curves for the astigmatism and distortion of the embodiment of FIG. 6, respectively. The field is flat and sagittal and tangential astigmatisms are corrected. It can be seen that the lens provides F-theta distortion with a good linearity across the whole field.

Figure 10A:
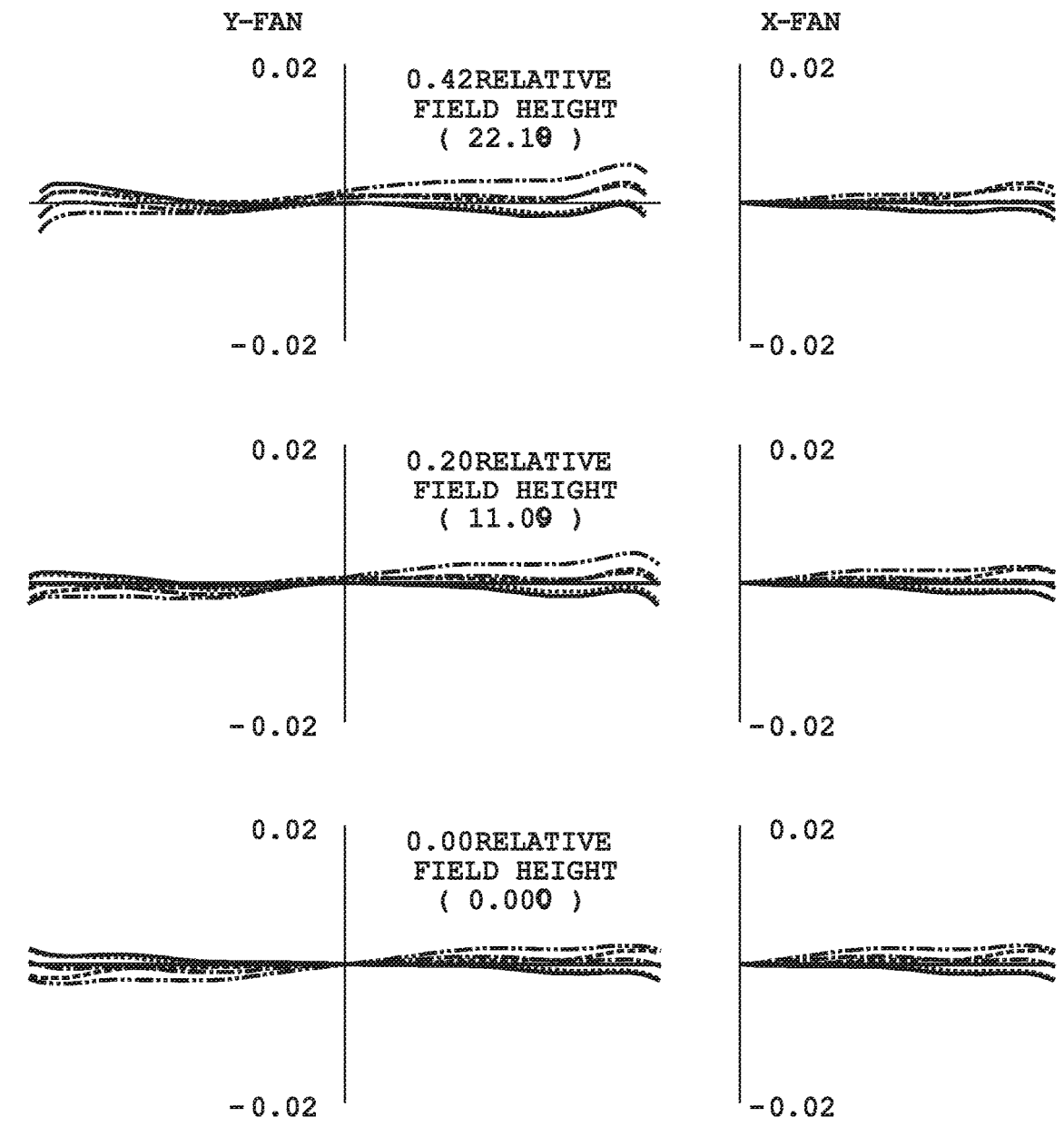
FIGS. 10A and 10B present RIM RAY curves for the embodiment of FIG. 6.
Figure 10B:
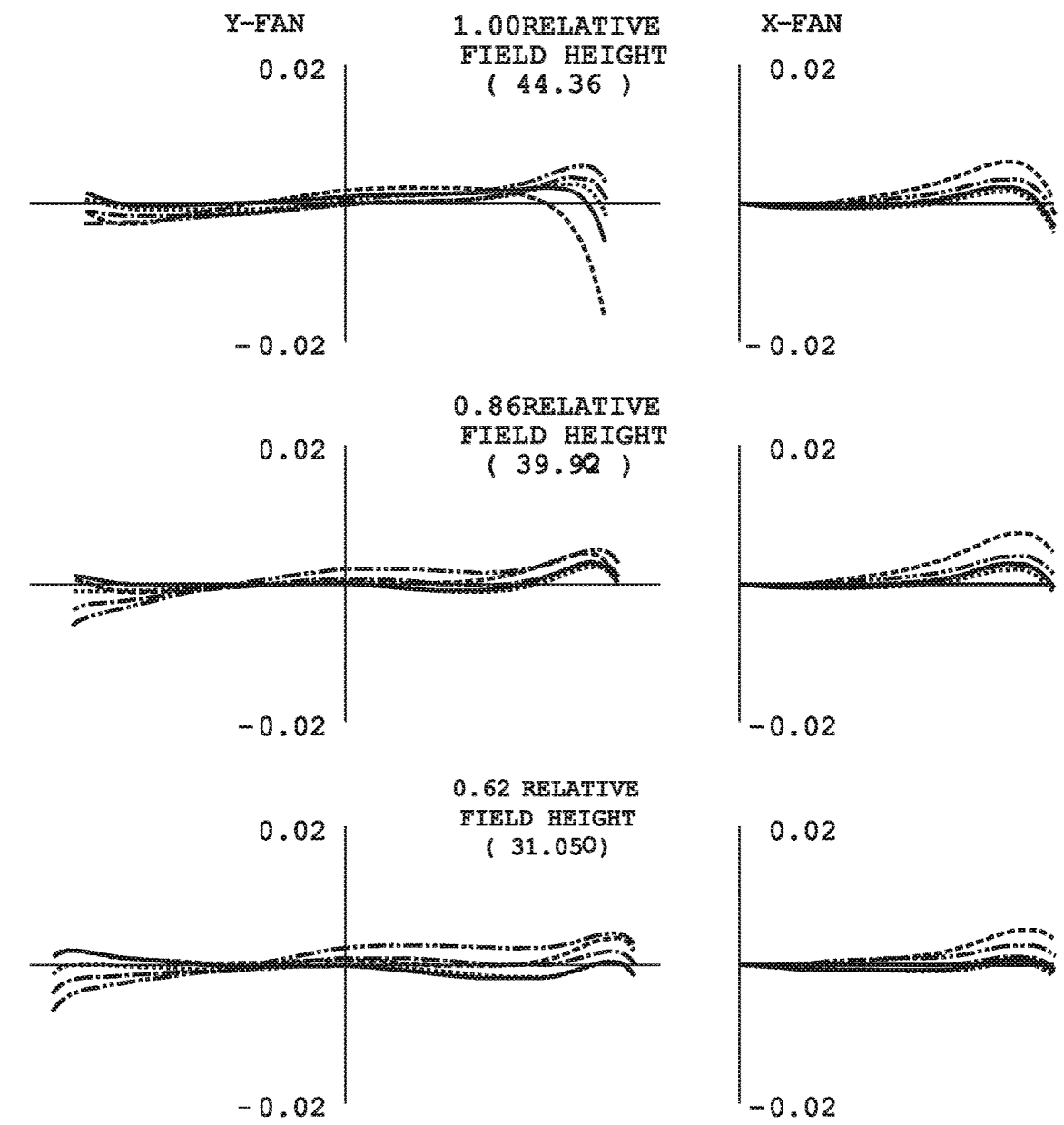

The RIM RAY curves in FIGS. 10A and 10B show the spherical aberration, coma and chromatic aberration correction over the spectrum of 450 nm-650 nm for the embodiment of FIG. 6 (F #=2.8).

Table 1 below presents scan linearity data for the embodiment of FIG. 6, for a calibrated focal length of 36.9291. In this embodiment, all optical elements are made from common and widely commercially available optical glasses. It can be seen that the F-theta distortion is smooth across the entire angle range of 88.7° degrees, and that the nonlinearity over this range does not exceed 0.035%.

TABLE 1

Scan linearity data for the embodiment of FIG. 6
SCAN LINEARITY

| RELATIVE FIELD HEIGHT | ANGLE (DEGREES) | IMAGE HEIGHT | REFERENCE IMAGE HEIGHT | ERROR (PERCENT) |
|---|---|---|---|---|
| 0.00 | 0.0000 | 0.000000 | 0.000000 | 0.0000 |
| 0.05 | 2.2180 | 1.430066 | 1.429578 | 0.0342 |
| 0.10 | 4.4360 | 2.860078 | 2.859156 | 0.0322 |
| 0.15 | 6.6540 | 4.289985 | 4.288734 | 0.0292 |
| 0.20 | 8.8720 | 5.719752 | 5.718312 | 0.0252 |
| 0.25 | 11.0900 | 7.149357 | 7.147891 | 0.0205 |
| 0.30 | 13.3080 | 8.578800 | 8.577469 | 0.0155 |
| 0.35 | 15.5260 | 10.008097 | 10.007047 | 0.0105 |
| 0.40 | 17.7440 | 11.437284 | 11.436625 | 0.0058 |
| 0.45 | 19.9620 | 12.866409 | 12.866203 | 0.0016 |
| 0.50 | 22.1800 | 14.295527 | 14.295781 | −0.0018 |
| 0.55 | 24.3980 | 15.724690 | 15.725359 | −0.0043 |
| 0.60 | 26.6160 | 17.153942 | 17.154397 | −0.0058 |
| 0.65 | 28.8340 | 18.583305 | 18.584515 | −0.0065 |
| 0.70 | 31.0520 | 20.012785 | 20.014093 | −0.0065 |
| 0.75 | 33.2700 | 21.442369 | 21.443672 | −0.0061 |
| 0.80 | 35.4880 | 22.872042 | 22.873250 | −0.0053 |
| 0.85 | 37.7060 | 24.301825 | 24.302828 | −0.0041 |
| 0.90 | 39.9240 | 25.731855 | 25.732406 | −0.0021 |
| 0.95 | 42.1420 | 27.162556 | 27.161984 | 0.0021 |
| 1.00 | 44.3600 | 28.595022 | 28.591562 | 0.0121 |

With reference again to FIG. 6, in a second general aspect of the present disclosure an optical imaging system combines an F-theta lens having a wide FFOV, as described above, with a detector having a small pixel pitch. Embodiments of the disclosed optical imaging system support airborne remote sensing requirements associated with the detection and tracking of moving objects. In certain airborne surveillance embodiments having F # not greater than 2.8, the lens has a focal plane diameter of 57.2 mm.

In the embodiment of FIG. 6, the image plane 308 is a small pixel pitch (1.25 μm) visible staring CMOS detector, which allows for Nyquist sampling (400 lines per mm) of targets at requisite frame rates to enable high track quality for targets of interest. The CMOS detector at the image plane 308 incorporates small pixel pitch CMOS detectors to minimize Size, Weight, and Power (SWaP) for the overall optical imaging system, while reducing cost for wide-FOV imaging. The CMOS detectors in the illustrated example are 18 mega-pixel detectors, and are arranged in an array format to create a mosaic image. A corresponding plurality of mosaic cameras are used to create a seamless large format image. The CMOS detector at the image plane 308 also supports a wide pixel FOV of 30° and a Chief Ray Angle (CRA) of 0°, thereby reducing any need for a telecentric lens design.

Table 2 present a lens prescription for the embodiment of FIG. 6. The first column of the table indicates the optical element number from FIG. 6. The second column indicates the 28 surfaces of the 14 optical elements (four plus four plus six optical elements for the first 10, second 20, and third 30 optical groups of FIG. 6, respectively), where the first surface number in each case refers to the left-hand surface of the corresponding optical element as shown in FIG. 6, and the second surface number refers to the corresponding right-hand surface of the optical element. Note that "Surface" 13 in Table 2 is not actually a surface of an optical element, but is the aperture stop "AS." Note further that optical elements 203 and 204 in FIG. 6 share surface 15 in Table 2. Accordingly, optical element 203 in FIG. 6 includes surfaces 14 and 15, and optical element 204 in FIG. 6 includes surfaces 15 and 16.

The type of glass for each of the optical elements is indicated in Table 2 in the row pertaining to the left (odd numbered except for 203) surface of each optical element, except for optical elements 203 and 204. For optical element 203, the type of glass is indicated in the row pertaining to surface 14, which is the left surface of that element. For optical element 204, the type of glass is indicated in the row pertaining to surface 16, which is the right surface of element 204, so as to avoid any confusion due to the sharing of surface 15 between optical elements 203 and 204.

Except for shared surface 15, the optical elements and aperture stop in Table 2 are assumed to be surrounded by air.

TABLE 2

Prescription for the lens of the embodiment of FIG. 6

| ELEMENT # | SURFACE | RADIUS | THICKNESS | GLASS TYPE |
|---|---|---|---|---|
| 101 | 1 | 156.26291 | 5.000000 | SFSL5_OHARA |
| | 2 | 31.29737 | 25.710059 | |
| 102 | 3 | −43.81249 | 15.000000 | SBSM16_OHARA |
| | 4 | −57.15761 | 2.000000 | |
| 103 | 5 | 331.35575 | 10.000000 | SF4_SCHOTT |
| | 6 | −241.87910 | 2.000000 | |
| 104 | 7 | 70.01799 | 7.779247 | SKI6_SCHOTT |
| | 8 | −566.86342 | 13.633405 | |
| 201 | 9 | −140.55343 | 5.000000 | SFSL5_OHARA |
| | 10 | −57.90215 | 2.000000 | |
| 202 | 11 | −117.48866 | 5.000000 | LF5G15_SCHOTT |
| | 12 | 239.25983 | 4.326788 | |
| Aperture stop | 13 (AS) | INFINITY | 4.150582 | |
| 203 | 14 | −445.03509 | 5.000000 | KZFSN5_SCHOTT |
| 203, 204 | 15 (shared) | 32.13367 | 5.631605 | |
| 204 | 16 | −4255.68909 | 2.000000 | NLAK22_SCHOTT |
| 301 | 17 | 40.35081 | 12.727917 | SFPL51_OHARA |
| | 18 | −35.02718 | 2.000000 | |
| 302 | 19 | −55.75130 | 5.000000 | KZFSN5_SCHOTT |
| | 20 | 53.75525 | 4.375314 | |
| 303 | 21 | 76.13685 | 14.750083 | SFPL51_OHARA |
| | 22 | −36.93684 | 2.000000 | |
| 304 | 23 | −60.91077 | 5.000000 | NF2_SCHOTT |
| | 24 | 84.56671 | 4.047927 | |
| 305 | 25 | 95.61004 | 14.649946 | STIH53_OHARA |
| | 26 | −66.94093 | 6.222224 | |
| 306 | 27 | −46.61453 | 5.000000 | SLAH60_OHARA |
| | 28 | −1571.31954 | 9.994903 | |

Surfaces 1, 3, 10, 12, 19, and 25 in Table 2 are aspherical, while the other surfaces are not. The aspheric coefficients for optical element surfaces 1, 3, 10, 12, 19, and 25 are given below, according to the aspheric equation:

$$Z = \frac{Cr^2}{1 + \sqrt{1-(1+k)C^2r^2}} + Ar^4 + Br^6 + Cr^8 + Dr^{10} + Er^{12} + Fr^{14} + Gr^{16} + Hr^{18} \quad (14)$$

Where:
Z=sag of the surface parallel to the z-axis
c=curvature at the pole of the surface (CUY)
r=radial distance=$\sqrt{x^2+y^2}$
A-H=deformation coefficients
k=conic constant
Where k=−$e^2$, where e is the eccentricity
  k=0 for a sphere
  −1<k<0 for an ellipsoid with major axis on the optical axis (prolate spheroid)
  k=−1 for a paraboloid
  k<−1 for a hyperboloid
  k>0 for an oblate spheroid (not a conic section) where the surface is generated by rotating an ellipse about its minor axis, and k=$e^2/1-e^2$ Aspheric Coefficients for Surfaces of Table 2 (all Other Surfaces are Non-Aspherical):
Surface 1:
  K: 0.000000
  A: 0.191925E−05 B: −0.830184E−09 C: 0.338411E−12 D: −0.104447E−15
  E: 0.157829E−19 F: 0.000000E+00 G: 0.000000E+00 H: 0.000000E+00

Surface 3
  K: 0.000000
  A: −0.270174E−06 B: 0.488008E−09 C: −0.729139E−13 D: 0.263600E−16
  E: 0.783185E−19
Surface 10
  K: 0.000000
  A: 0.101388E−05 B: 0.134702E−08 C: −0.950185E−11 D: 0.187555E−13
  E: −0.144974E−16
Surface 12
  K: 0.000000
  A: 0.815966E−06 B: −0.315451E−08 C: 0.580318E−10 D: −0.249301E−12
  E: 0.519774E−15
Surfaces 19
  K: 0.000000
  A: −0.109742E−04 B: −0.347223E−08 C: −0.289703E−11 D: 0.190193E−14
Surface 25
  K: 0.000000
  A: 0.196818E−05 B: −0.671647E−09 C: 0.177385E−12 D: 0.571892E−16

Embodiments of the disclosed image system can be employed for Wide Area Motion Imagery. The system can be deployed for high altitude wide-area surveillance. Some applications include identification and tracking of vehicles, vessels, and airborne objects as well as persons and animals. A further application is for Gorgon Stare which is a video capture technology used by the United States as a wide-area surveillance sensor system.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A wide field of view F-Theta lens configured to form an image of an object on an image plane, the lens comprising:
    a first optical group including a plurality of optical elements, the first optical group having a positive optical power;
    a second optical group, including a plurality of optical elements, the second optical group having a negative optical power;
    an aperture stop located within the second optical group; and
    a third optical group, including a plurality of optical elements, the third optical group having a positive optical power;
    the lens having a full field of view of at least 88.7 degrees,
    the lens being color corrected over a wavelength range of 450 nm to 640 nm, wherein the focal length of the lens at 640 nm is equal to the focal length of the lens at 450 nm,
    the lens having an F-number value of less than 2.8;
    the lens being achromatic over a range of at least 450 nm to 650 nm;
    the lens having a length of not more than 200 mm
    the lens having a focal plane diameter of at least 57.2 mm.

2. The lens of claim 1, wherein each of the optical groups includes at least four optical elements.

3. The lens of claim 1, wherein the lens provides a resolution of 2.5 microns or better.

4. The lens of claim 1, wherein the first optical group includes exactly four optical elements.

5. The lens of claim 4, wherein the optical elements in the first optical group are configured such that, in order from the object to the image plane, the optical elements in the first optical group have a negative optical power, a negative optical power, a positive optical power, and a positive optical power, respectively.

6. The lens of claim 4, wherein:
    in order from the object to the image plane, the optical elements of the first optical group are respectively in the form of:
    a first optical element having a double concave shape;
    a second optical element having a negative meniscus whose concave surface faces toward the object;
    a third optical element having a double convex shape; and
    a fourth optical element having a double convex shape.

7. The lens of claim 6, wherein a first surface of the first optical element of the first optical group is formed aspherical.

8. The lens of claim 6, wherein a first surface of the second optical element of the first optical group is formed aspherical.

9. The lens of claim 1, wherein the second optical group includes exactly four optical elements.

10. The lens of claim 9, wherein the optical elements in the second optical group are configured such that, in order from the object to the image plane, the optical elements in the second optical group have a positive optical power, a negative optical power, a negative optical power, and a positive optical power, respectively.

11. The lens of claim 9, wherein in order from the object to the image plane, the optical elements of the second optical group are respectively in the form of:
    a first element having a positive meniscus shape whose concave surface faces toward the object;
    a second element having a double concave shape;
    a third element having a double concave shape; and
    a fourth element having a double convex shape.

12. The lens of claim 11, wherein a second surface of the third optical element of the second optical group is cemented to a first surface of the fourth optical element of the second optical group.

13. The lens of claim 11, wherein a second surface of the first element of the second optical group is formed aspherical.

14. The lens of claim 11, wherein a second surface of the second element of the second optical group is formed aspherical.

15. The lens of claim 9, wherein the aperture stop is located within the second optical group such that two of the optical elements of the second optical group are between the object and the aperture stop, and two of the optical elements of the second optical group are between the aperture stop and the image plane.

16. The lens of claim 1, wherein the third optical group includes exactly six optical elements.

17. The lens of claim 16, wherein the optical elements in the third optical group are configured such that, in order from the object to the image plane, the optical elements in the third optical group have a positive optical power, a negative optical power, a positive optical power, a negative optical power, a positive optical power, and a negative optical power, respectively.

18. The lens of claim 16, wherein in order from the object to the image plane, the optical elements of the third optical group are respectively in the form of:
    a first optical element having a double convex shape;
    a second optical element having a double concave shape;
    a third optical element having a double convex shape;
    a fourth optical element having a double concave shape;
    a fifth optical element having of a double convex shape; and
    a sixth element having a negative meniscus shape whose concave surface faces toward the object.

19. The lens of claim 18, wherein a first surface of the second element of the third optical group is formed aspherical.

20. The lens of claim 18, wherein a first surface of the fifth element of the third optical group is formed aspherical.

21. The lens of claim 1, wherein the first optical group includes exactly four optical elements, the second optical group includes exactly four optical elements and the third optical group includes exactly six optical elements, and wherein the lens, the first, second, and third optical groups, and the optical elements of the first, second and third optical groups satisfy the relationships:

$0.35 < F_1/F_{10} < 0.45;$ $-0.40 < F_{10}/F_{20} < -0.30;$ $1.18 < F_{10}/F_{30} < 1.34;$ $-1.85 < F_{10}/F_{101} < -1.65;$ $0.085 < F_{101}/F_{102} < 0.15;$ $-0.34 < F_{101}/F_{103} < -0.25;$ $-0.56 < F_{101}/F_{104} < -0.48;$ $1.75 < F_{30}/F_{301} < 1.95;$ $-1.10 < F_{301}/F_{302} < -0.90;$ $0.70 < F_{301}/F_{303} < 0.85;$ $-0.75 < F_{301}/F_{304} = F_{301}/F_{306} < -0.68;$ $0.80 < F_{301}/F_{305} < 0.86;$ $-1.40 < F_{20}/F_{201} < -1.20;$ $-1.55 < F_{201}/F_{202} < -1.35;$ $-4.45 < F_{201}/F_{203} < -4.30;$ $3.80 < F_{201}/F_{204} < 4.25;$ $0.90 < n_{101}/n_{102} = n_{101}/n_{104} < 0.96;$ $0.84 < n_{101}/n_{103} < 0.88;$ $0.85 < n_{201}/n_{202} = n_{201}/n_{203} = n_{201}/n_{204} < 1;$ $0.85 < n_{301}/n_{302} = n_{301}/n_{304} < 0.95;$ $0.90 < n_{301}/n_{303} < 1.15;$ $0.75 < n_{301}/n_{305} = n_{301}/n_{306} < 0.88;$ $1.14 < V_{101}/V_{102} = V_{101}/V_{104} < 1.22;$ $2.45 < V_{101}/V_{103} < 2.65;$ $1.65 < V_{201}/V_{202} = V_{201}/V_{203} < 1.85;$ $1.15 < V_{201}/V_{202} < 1.35;$ $2 < V_{301}/V_{302} = V_{301}/V_{304} = V_{301}/V_{306} < 2.25;$ $0.90 < V_{301}/V_{303} < 1.15;$ and $3.30 < V_{301}/V_{305} < 3.55;$ where:

$F_1$ is the focal length of the lens;

$F_{10}$, $F_{20}$ and $F_{30}$ are the focal lengths of the first, the second and the third optical groups respectively;

$F_{101}$, $F_{102}$, $F_{103}$ and $F_{104}$ are the focal lengths of the optical elements of the first optical group respectively in order from the object to the image plane;

$F_{201}$, $F_{202}$, $F_{203}$ and $F_{204}$ are the focal lengths of the optical elements of the second optical group respectively in order from the object to the image plane;

$F_{301}$, $F_{302}$, $F_{303}$, $F_{304}$, $F_{305}$ and $F_{306}$ are the focal lengths of the optical elements of the third optical group respectively in order from the object to the image plane;

$n_{101}$, $n_{102}$, $n_{103}$ and $n_{104}$ are the indices of refraction of the optical elements of the first optical group respectively in order from the object to the image plane; and $n_{201}$, $n_{202}$, $n_{203}$ and $n_{204}$ are the indices of refraction of the optical elements of the second optical group respectively in order from the object to the image plane;

$n_{301}$, $n_{302}$, $n_{303}$, $n_{304}$, $n_{305}$ and $n_{306}$ are the indices of refraction of the optical elements of the second optical group respectively in order from the object to the image plane;

$V_{101}$, $V_{102}$, $V_{103}$, and $V_{104}$ are the Abby numbers of the optical elements of the first optical group respectively in order from the object to the image plane;

$V_{201}$, $V_{202}$, $V_{203}$, and $V_{204}$ are the Abby numbers of the optical elements of the second optical group respectively in order from the object to the image plane; and $V_{301}$, $V_{302}$, $V_{303}$, $V_{304}$, $V_{305}$, and $V_{306}$ are the Abby numbers of the optical elements of the third optical group respectively in order from the object to the image plane.

22. An optical imaging system, comprising:

A wide field of view, color corrected F-Theta lens configured to form an image of an object on an image plane, the lens comprising:
 a first optical group including a plurality of optical elements, the first optical group having a positive optical power;
 a second optical group, including a plurality of optical elements, the second optical group having a negative optical power; and
 a third optical group, including a plurality of optical elements, the third optical group having a positive optical power,
 the lens having a full field of view of at least 88 degrees, and
 the lens having an F-stop value of no more than 2.8; and
a detector configured to detect an image formed on the image plane by the lens.

23. The optical imaging system of claim 22, wherein the detector is a CMOS detector.

24. The optical imaging system of claim 22, wherein the detector has a pixel pitch of no more than 1.25 microns.

25. The optical imaging system of claim 22, wherein the detector has a Nyquist sampling of at least 400 lines per mm.

26. The optical imaging system of claim 22, wherein the detector has a capacity of at least 18 megapixels.

27. The optical imaging system of claim 22, wherein the detector has a pixel field of view of at least 30 degrees.

28. The optical imaging system of claim 22, wherein the detector includes a plurality of focal plane arrays arranged in an array and configured to obtain a mosaic image.

29. The optical imaging system of claim 28, wherein the detector includes a minimum overlap region between adjacent CMOS detectors of 50 image pixels, such that there are no gaps in the mosaic image.

* * * * *